No. 659,536. Patented Oct. 9, 1900.
H. H. LARSEN.
HARROW.
(Application filed May 17, 1900.)
(No Model.) 2 Sheets—Sheet 2.

WITNESSES:
Edward Thorpe
J. L. McAuliffe

INVENTOR
Hans H. Larsen.
BY
ATTORNEYS

UNITED STATES PATENT OFFICE.

HANS HENRY LARSEN, OF CAMPBELL, MINNESOTA.

HARROW.

SPECIFICATION forming part of Letters Patent No. 659,536, dated October 9, 1900.

Application filed May 17, 1900. Serial No. 17,053. (No model.)

*To all whom it may concern:*

Be it known that I, HANS HENRY LARSEN, a subject of the King of Denmark, and a resident of Campbell, in the county of Wilkin and State of Minnesota, have invented a new and Improved Harrow, of which the following is a full, clear, and exact description.

The object of the invention is to improve harrows in several particulars as regards the frame, the teeth, and the wheels or rollers, which are thrown down to elevate the teeth and support the harrow in traveling to and from the field. The present improvements in the frame produce a light and strong construction. The parts are few in number, readily interchangeable in repairing, and are so arranged as to effectively support and brace the teeth. The form of the teeth makes them self-cleaning, and the novel mounting of the wheels, which are arranged in pairs on independent shafts to be separately rocked, facilitates the throwing down of the wheels and the raising of the frame by dividing the labor into two simple and easy operations.

Reference is to be had to the accompanying drawings, forming a part of this specification, in which similar characters of reference indicate corresponding parts in all the figures.

Figure 1:
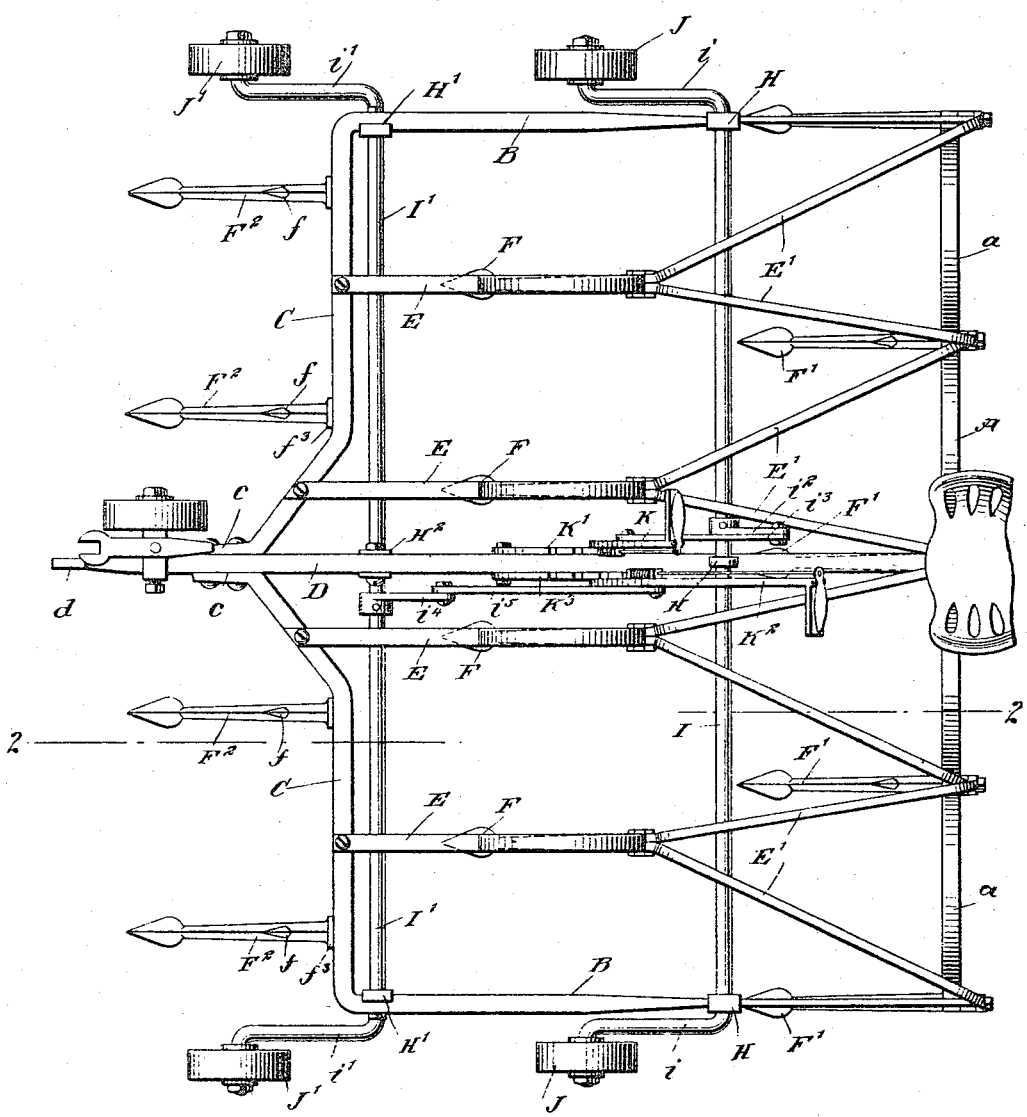
Figure 2:
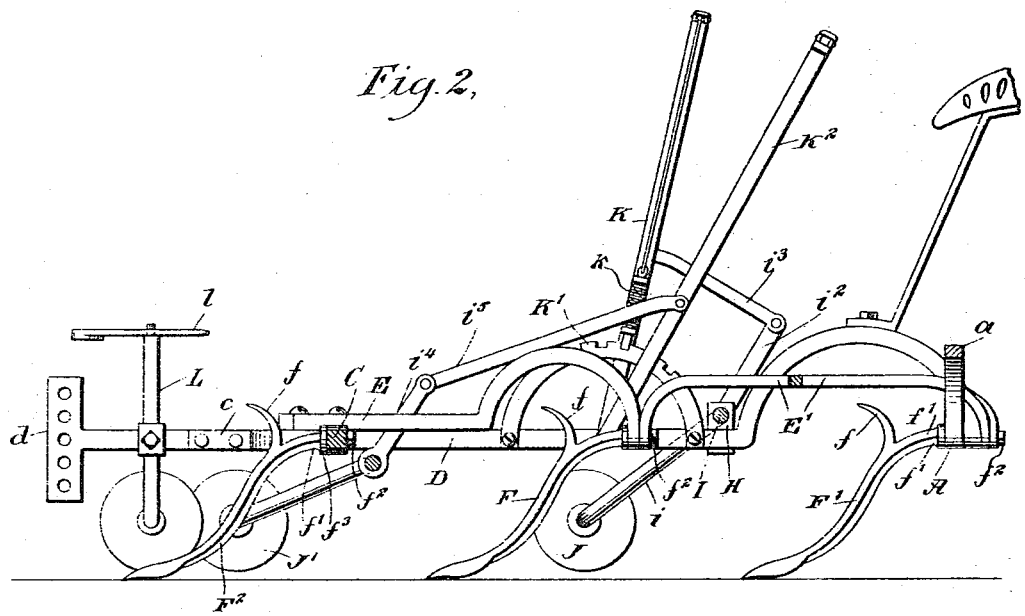
Figure 3:
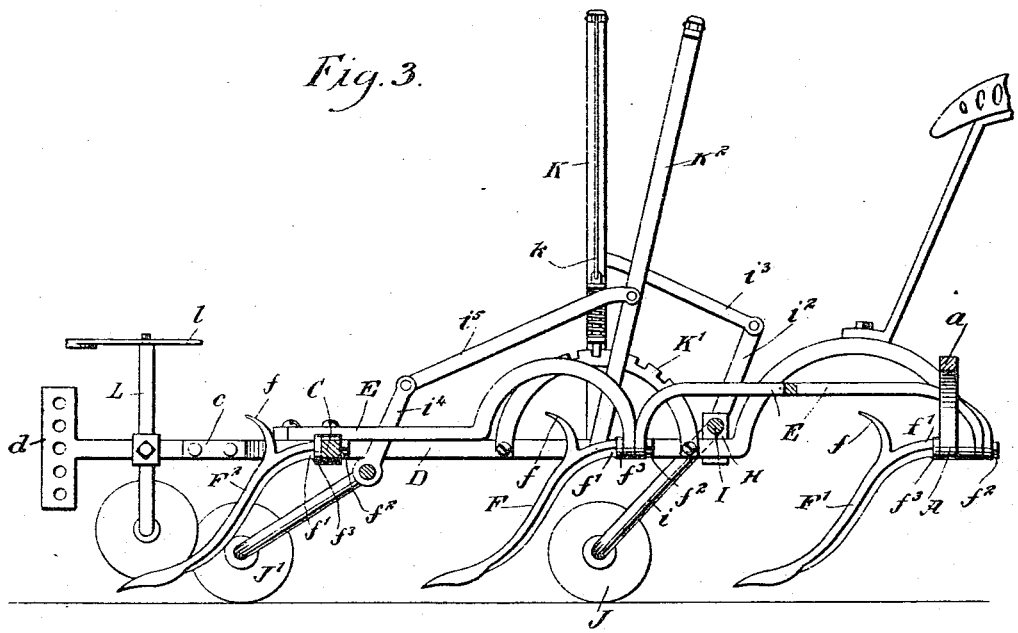

Figure 1 is a plan view of a harrow embodying my invention. Fig. 2 is a longitudinal section taken adjacent to the central longitudinal frame-bar on the line 2 2 in Fig. 1, the frame being shown resting on the teeth or in operative position; and Fig. 3 is a view similar to Fig. 2, but showing the wheels lowered to support the frame, with the teeth elevated out of contact with the ground.

In constructing the frame of my improved harrow, which is of steel, I provide the rear bar A, which extends continuously from side to side and connects with the side bars B B, which are preferably thickened toward their forward ends for strength, as seen in the plan view, Fig. 1, and continued around the front to form the two-part front bar C C, the adjacent ends $c$ $c$ of which terminate in forward extensions, which are suitably secured to the central longitudinal bar D, which is the main longitudinal bar of the frame and forms the draft-bar, having in practice any suitable draft-head $d$. Extending rearwardly from the front cross-bar C C are a series of short longitudinal bars E, which terminate at about the transverse center of the frame, and each carries at its rear end a harrow-tooth F or other suitable cultivator or the like, and each of the said bars E and its tooth F is braced by a pair of braces E', which diverge and extend rearwardly to a connection with the rear cross-bar A. The rear bar is formed of a succession of integral arches $a$, the teeth being secured at the junction of the arches. Thus the rear teeth F' are at the lowest point of the frame, and the intervening arches will clear the weeds, stalks, and the like in line therewith, the teeth dislodging and clearing themselves from the weeds and the like, as next explained.

Each of the central teeth F and the rear teeth F', as well as the forward row of teeth $F^2$, is formed, preferably, in a compound curve, and in any event the tooth has a clearing-finger $f$ near its upper end and disposed on a curved line in a forward direction, which serves to deflect and fend off the weeds and the like that may gather against and be crowded upward on the tooth. Each tooth also at its upper end is given a horizontal rearward trend, as at $f'$, and its extreme end is threaded to receive a nut $f^2$, which coacts with an integral boss or flange $f^3$, between which nut and boss the frame members are clamped. Thus horizontal upper ends of the front teeth $F^2$ pass rearwardly through the front cross-bar C C and are clamped thereto by the nut $f^2$ and flange $f^3$. The intermediate row F of teeth pass horizontally through the rear ends of the short longitudinal bars E and the forward ends of the braces E', which bars E are of arched form in the rear portion, as seen in Figs. 2 and 3, to give clearance-space above the teeth F for the weeds and the like thrown off by said teeth. The diagonal braces E' also are arched throughout to provide the necessary horizontal holes for the teeth ends and give clearance for weeds and the like. The rear teeth F' are similarly secured to the rear cross-bar A and coacting members. Thus at the center the harrow-tooth passes through said rear cross-bar, through the downwardly-bent rear end of the main longitudinal bar D, and through the ends of two braces E', as shown clearly in Figs. 2 and 3, while the teeth F' at each side of the center are passed only through the bar A and two braces E', as will be understood from Fig. 1.

In bearings formed by short risers or blocks H on the side bars B and main or central bar D the rear shaft I is mounted to rock, and its cranked ends $i$ carry the running wheels or rollers J, and similarly in hangers H', depending from the front cross-bar C C and an alining hanger H² on the bar D, the forward rock-shaft I' is mounted, its cranked ends $i'$ carrying the forward running wheels or rollers J'. The shaft I has a rigid arm $i^2$, secured thereto, which is connected by a forwardly-ranging link $i^3$ with the hand-lever K for rocking said shaft, and the lever is provided with the customary spring-acted latch $k$, which engages the notched segment K'. The forward shaft I' similarly has a rigid arm $i^4$, which connects by a rearwardly-extending link $i^5$ to the hand-lever K², which is provided with the necessary latch $k'$, engaging the notched segment K³.

By mounting the wheels on the independent shafts and providing each with its complement of operating devices it will be evident that the labor of raising and lowering the harrow will be greatly lessened, since the one set of wheels—say the forward ones—upon being thrown down will tilt the harrow, the rear row of teeth forming a fulcrum. Then upon throwing down the rear wheels the rear of the harrow will be raised, the forward wheels forming a fulcrum.

It will be observed that the front cross-bar is substantially straight and that the clearing-fingers $f$ of the front teeth extend up to or above the said cross-bar C C. Also it will be seen that there are wide open spaces between the frame members in the rear of the front teeth. This construction and arrangement of the front teeth and adjoining frame members provides proper clearance and escape of the weeds and the like, and contributing to this end also is the position of the forward rock-shaft I' beneath the frame and adjacent to the front cross-bar.

A wheel L is provided on the forward end of the central bar D; but this possesses no special novelty except that its handle $l$ is made in the form of a wrench, which is adapted to the nuts entering into the construction of the frame, the wrench being removably secured, as, for instance, by a screw-thread connection.

I have specifically defined the invention with reference to a harrow; but it is evident the various novel features may be embodied in any cultivator or like implement, and it will be understood that the words "tooth" and "teeth" are used generically to include all equivalents, such as shovels, since the novelty resides in the clearer and the attaching end and not in the form of the point.

Having thus described my invention, I claim as new and desire to secure by Letters Patent—

1. In an agricultural implement, a frame comprising front and rear cross-bars and longitudinal connections including bars extending rearwardly from the front bar, braces connecting said longitudinal bars with the rear cross-bar, and teeth secured at the junction of the longitudinal bars and braces.

2. In an agricultural implement, a frame comprising front and rear cross-bars and longitudinal connections, including a main central longitudinal bar extending from front to rear, short longitudinal bars terminating short of the rear cross-bar, and braces diverging from the short bars and connecting with the rear cross-bar, the main and short longitudinal bars being arched at the rear ends, teeth secured to the short bars at the junction of said bars and their braces, and teeth secured to the rear cross-bar, one tooth serving to connect the main longitudinal bar with the rear cross-bar.

3. In an agricultural implement, a frame carrying teeth, the frame including short longitudinal members extending rearwardly from the front, and braces extending from the short bars rearwardly and secured at their rear ends, and teeth having their upper ends uniting the adjacent ends of the said bars and their braces.

4. In an agricultural implement, a frame and teeth thereon, the frame including a cross-bar made up of a succession of arches and the teeth being secured between adjacent arches.

5. In an agricultural implement, a frame and teeth thereon, the frame including a cross-bar made up of a succession of arches and the teeth being secured between adjacent arches, the upper ends of the teeth passing horizontally through the cross-bar.

6. In an agricultural implement, a frame and teeth carried thereby, the frame comprising front and rear cross-bars and longitudinal connections including short bars extending rearwardly from the front bar and braces connecting the short bars with the rear cross-bar, said short bars being arched at their rear ends and the rear cross-bar having a series of arches, the teeth having each a clearing-finger near the upper end, and being secured respectively beneath the arches of the short bars and between the arches of the rear bar, said arches forming clearances for the weeds, &c., thrown off from the teeth.

7. In an agricultural implement, a frame including longitudinally-ranging bars and teeth at the under side of said bars, the teeth having each a clearing-finger near the upper end, and the said longitudinal bars being arched at a point above the teeth.

8. In an agricultural implement, a frame comprising a rear cross-bar, a longitudinal bar about centrally of the frame and extending from the rear cross-bar to the front, side bars extending forwardly from the rear cross-bar, and returned around the front to form a two-part front cross-bar, the adjacent ends being secured to the central longitudinal bar, and additional frame members uniting the front and rear cross-bars, said additional members being formed at one end of a longitudinally-ranging bar and composed at the opposite end of diagonally-ranging braces.

9. An agricultural implement comprising a frame and teeth, the teeth each having a clearing-finger near the upper end, said finger ranging upwardly and forwardly in curved form, the end of the finger being free from the frame and spaced therefrom.

10. An agricultural implement, comprising a frame provided with teeth and rear and front rock-shafts carrying wheels, the said frame being composed of a front cross-bar which is straight for its major portion, a rear cross-bar made up of a succession of arches and longitudinal members, teeth being carried by the said cross-bars and longitudinal members, and the frame having wide, open spaces in the rear and in line with the front teeth, the forward shaft being mounted at the under side of the frame and the rear rock-shaft on the upper side of the frame, whereby to avoid offering obstruction to weeds and the like.

In testimony whereof I have signed my name to this specification in the presence of two subscribing witnesses.

HANS HENRY LARSEN.

Witnesses:
   C. F. WALSH,
   H. HENRICKSON.